(12) United States Patent
Sato et al.

(10) Patent No.: US 11,181,709 B2
(45) Date of Patent: Nov. 23, 2021

(54) MANUFACTURING METHOD OF OPTICAL FIBER RIBBON AND MANUFACTURING APPARATUS THEREOF

(71) Applicant: SUMITOMO ELECTRIC INDUSTRIES, LTD., Osaka (JP)

(72) Inventors: Fumiaki Sato, Osaka (JP); Shigeru Suemori, Osaka (JP); Hiroki Ishikawa, Osaka (JP); Masahiko Ishikawa, Osaka (JP); Fumikazu Yoshizawa, Osaka (JP)

(73) Assignee: SSUMITOMOM ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/962,612

(22) PCT Filed: Jan. 17, 2019

(86) PCT No.: PCT/JP2019/001174
§ 371 (c)(1),
(2) Date: Jul. 16, 2020

(87) PCT Pub. No.: WO2019/142842
PCT Pub. Date: Jul. 25, 2019

(65) Prior Publication Data
US 2020/0409006 A1 Dec. 31, 2020

(30) Foreign Application Priority Data
Jan. 18, 2018 (JP) .............................. JP2018-006308

(51) Int. Cl.
*G02B 6/44* (2006.01)

(52) U.S. Cl.
CPC .................................. *G02B 6/448* (2013.01)

(58) Field of Classification Search
CPC ...................................................... G02B 6/448
See application file for complete search history.

(56) References Cited

U.S. PATENT DOCUMENTS 6,175,677 B1 1/2001 Yang et al.
6,195,491 B1 2/2001 Jackson et al.
(Continued)

FOREIGN PATENT DOCUMENTS

JP S63-306407 A 12/1988
JP H09-090179 A 4/1997
(Continued)

*Primary Examiner* — Omar R Rojas
(74) *Attorney, Agent, or Firm* — Faegre Drinker Biddle & Reath LLP (57) ABSTRACT

Provided is a manufacturing method of an optical fiber ribbon for manufacturing an intermittent-connection-type optical fiber ribbon including a connection part and a non-connection part. The manufacturing method includes: a release agent applying process of intermittently applying a release agent for preventing optical fibers from being bonded to each other with a connection resin in a longitudinal direction of the optical fibers in a state where the optical fibers are arranged in parallel; and a connection resin applying process of allowing the optical fibers in the state of being arranged in parallel to pass through a die for applying the connection resin around the optical fibers after the release agent applying process, and of curing the connection resin.

7 Claims, 7 Drawing Sheets

(56) References Cited

U.S. PATENT DOCUMENTS

| | | | |
|---|---|---|---|
| 7,187,830 B2 * | 3/2007 | Blazer | G02B 6/4404 385/100 |
| 2016/0161692 A1 | 6/2016 | Namazue et al. | |
| 2017/0115461 A1 | 4/2017 | Namazue et al. | |
| 2017/0184803 A1 | 6/2017 | Namazue et al. | |
| 2017/0219792 A1 | 8/2017 | Debban et al. | |

FOREIGN PATENT DOCUMENTS

| | | | |
|---|---|---|---|
| JP | 2000-344552 A | 12/2000 | |
| JP | 2002-341205 A | 11/2002 | |
| JP | 2003-177250 A | 6/2003 | |
| JP | 2013-88617 A | 5/2013 | |
| JP | 2013-182146 A | 9/2013 | |
| JP | 2014-085512 A | 5/2014 | |
| JP | 2016-080849 A | 5/2016 | |
| JP | 2017-138594 A | 8/2017 | |
| JP | 2017-156560 A | 9/2017 | |

* cited by examiner

FIG.6

MANUFACTURING METHOD OF OPTICAL FIBER RIBBON AND MANUFACTURING APPARATUS THEREOF

TECHNICAL FIELD

The present disclosure relates to a manufacturing method of an optical fiber ribbon and a manufacturing apparatus thereof.

The present application claims the benefit of priority of Japanese Patent Application No. 2018-006308, filed on Jan. 18, 2018, the content of which is incorporated herein by reference.

BACKGROUND ART

Patent Literature 1 describes an optical fiber ribbon in which optical fibers including three or more cores are disposed in parallel, and the adjacent optical fibers including two cores are connected to each other by a connection part, and the connection part is intermittently provided in a ribbon longitudinal direction and a ribbon width direction, respectively.

Patent Literature 2 describes a manufacturing apparatus of an optical fiber ribbon including: an application roll having a space inside and a plurality of application holes which communicate with the space on an outer peripheral surface; a pressure part disposed in the space; and an adhesive member supplying part that supplies an adhesive member to the space. Described is a manufacturing method of an intermittently-connected-type optical fiber ribbon in which the adhesive member is intermittently applied between a plurality of optical fibers aligned at a predetermined interval by using the manufacturing apparatus, and the optical fibers are bond to each other.

CITATION LIST

Patent Literature

Patent Literature 1: JP-A-2013-88617
Patent Literature 2: JP-A-2016-080849

SUMMARY OF INVENTION

A manufacturing method of an optical fiber ribbon for manufacturing an intermittent-connection-type optical fiber ribbon including a connection part and a non-connection part, the manufacturing method including:

a release agent applying process of intermittently applying a release agent for preventing optical fibers from being bonded to each other with a connection resin in a longitudinal direction of the optical fibers in a state where the optical fibers are arranged in parallel; and a connection resin applying process of allowing the optical fibers in the state of being arranged in parallel to pass through a die for applying the connection resin around the optical fibers after the release agent applying process, and of curing the connection resin.

A manufacturing apparatus of an optical fiber ribbon for manufacturing the intermittent-connection-type optical fiber ribbon including a connection part and a non-connection part, the manufacturing apparatus including:

a release agent applying part that intermittently applies a release agent for preventing optical fibers from being bonded to each other with a connection resin in a state where the optical fibers are arranged in parallel; and a connection resin applying part that allows the optical fibers to which the release agent is intermittently applied to pass through a die for applying the connection resin around the optical fibers, and that cures the connection resin.

DESCRIPTION OF EMBODIMENTS

Technical Problem

In the manufacturing method of the intermittently-connected-type optical fiber ribbon described above, when the connection resin is intermittently applied, for example, when the connection resin is applied between the optical fibers from the application hole of the application roll described in Patent Literature 2, viscosity of the connection resin is generally high, such that there is a possibility of generating a case in which the connection resin swells or generating an application abnormality caused by a resin reservoir. As described above, in the manufacturing method of the intermittently-connected-type optical fiber ribbon of a related art, it is difficult to apply the connection resin between the optical fibers with high accuracy.

An object of the present disclosure is to provide a manufacturing method of an optical fiber ribbon and a manufacturing apparatus thereof which can efficiently and accurately manufacture the optical fiber ribbon having an intermittently-connected-type structure.

Advantageous Effects of the Present Disclosure

According to a manufacturing method of an optical fiber ribbon of the present disclosure and a manufacturing apparatus thereof, it is possible to efficiently and accurately manufacture the optical fiber ribbon having an intermittently-connected-type structure.

DESCRIPTION OF EMBODIMENTS OF THE PRESENT DISCLOSURE

First, embodiments of the present disclosure will be listed and described.

(1) A manufacturing method of an optical fiber ribbon for manufacturing an intermittent-connection-type optical fiber ribbon including a connection part and a non-connection part, the manufacturing method including:

a release agent applying process of intermittently applying a release agent for preventing optical fibers from being bonded to each other with a connection resin in a longitudinal direction of the optical fibers in a state where the optical fibers are arranged in parallel; and a connection resin applying process of allowing the optical fibers in the state of being arranged in parallel to pass through a die for applying the connection resin around the optical fibers after the release agent applying process, and of curing the connection resin.

When the connection resin is intermittently applied, it is required to increase viscosity of the connection resin to some extent and to apply the connection resin with a certain thickness in order to obtain good connectivity. On the other hand, in the above-described manufacturing method of the optical fiber ribbon, the release agent may be intermittently applied thinly on the surface of the optical fiber in the release agent applying process. The release agent may have viscosity lower than that of the connection resin.

Therefore, the manufacturing method of the optical fiber ribbon can more improve a linear speed of the manufacturing apparatus than a case where the connection resin is intermittently applied. The release agent can form an intermittent pattern on the plurality of optical fibers in a state of being arranged in parallel more accurately than the connection resin.

Next, by allowing the plurality of optical fibers to pass through the die for applying the connection resin around the optical fiber after the release agent applying process, a portion where the release agent is not applied becomes the connection part in such a manner that the optical fibers are bonded to each other by the connection resin. A portion where the release agent is applied becomes the non-connection part in such a manner that the optical fibers are not bonded to each other by the connection resin. As such, it is possible to manufacture the intermittently-connected-type optical fiber ribbon including the connection part and the non-connection part. As a result, it is possible to manufacture the optical fiber ribbon having an intermittently-connected-type structure efficiently and accurately.

(2) The release agent applying process may be a process of intermittently supplying and applying the release agent from the surfaces of the optical fibers in the state of being arranged in parallel.

According to the above-described method, the release agent can be intermittently applied by intermittently supplying the release agent from the surface of the optical fiber.

(3) The release agent applying process may be a process of applying the release agent through a screen plate having a pattern in which holes are intermittently opened.

According to the above-described method, since a mechanism for intermittently supplying the release agent is not required, the linear speed of the manufacturing apparatus can be further improved. The intermittent pattern is formed with the screen plate in advance, thereby making it possible to easily manufacture the intermittently-connected-type optical fiber ribbon having different intermittent patterns only by changing the screen plate.

(4) The release agent may include silicone.

(5) The release agent may include a fluorine compound.

(6) The release agent may include alcohol.

(7) A manufacturing apparatus of an optical fiber ribbon for manufacturing the intermittent-connection-type optical fiber ribbon including a connection part and a non-connection part, the manufacturing apparatus including:

a release agent applying part that intermittently applies a release agent for preventing optical fibers from being bonded to each other with a connection resin in a state where the optical fibers are arranged in parallel; and a connection resin applying part that allows the optical fibers to which the release agent is intermittently applied to pass through a die for applying the connection resin around the optical fibers, and that cures the connection resin.

According to the above-described configuration, since the release agent is intermittently applied by the release agent applying part, it is possible to more improve a linear speed of the manufacturing apparatus at the time of manufacturing than an apparatus that intermittently applies the connection resin. The release agent can form an intermittent pattern on the plurality of optical fibers in a state of being arranged in parallel more accurately than the connection resin.

Next, by allowing the plurality of optical fibers in the state of being arranged in parallel, to which the release agent is intermittently applied, to pass through the die for applying the connection resin around the optical fiber in the connection resin applying part, a portion where the release agent is not applied becomes the connection part in such a manner that the optical fibers are bonded to each other by the connection resin. A portion where the release agent is applied becomes the non-connection part in such a manner that the optical fibers are not bonded to each other by the connection resin. As such, it is possible to manufacture the intermittently-connected-type optical fiber ribbon having the connection part and the non-connection part. As a result, it is possible to manufacture the optical fiber ribbon having an intermittently-connected-type structure efficiently and accurately.

DETAILS OF EMBODIMENTS OF THE PRESENT DISCLOSURE

A specific example of a manufacturing method of an optical fiber ribbon according to embodiments of the present disclosure and a manufacturing apparatus thereof will be described hereinafter with reference to the drawings.

The present invention is not limited to these embodiments, and is indicated by the scope of claims. The present invention is intended to include meanings equivalent to the scope of claims and all modifications within the scope.

First Embodiment

Figure 1:
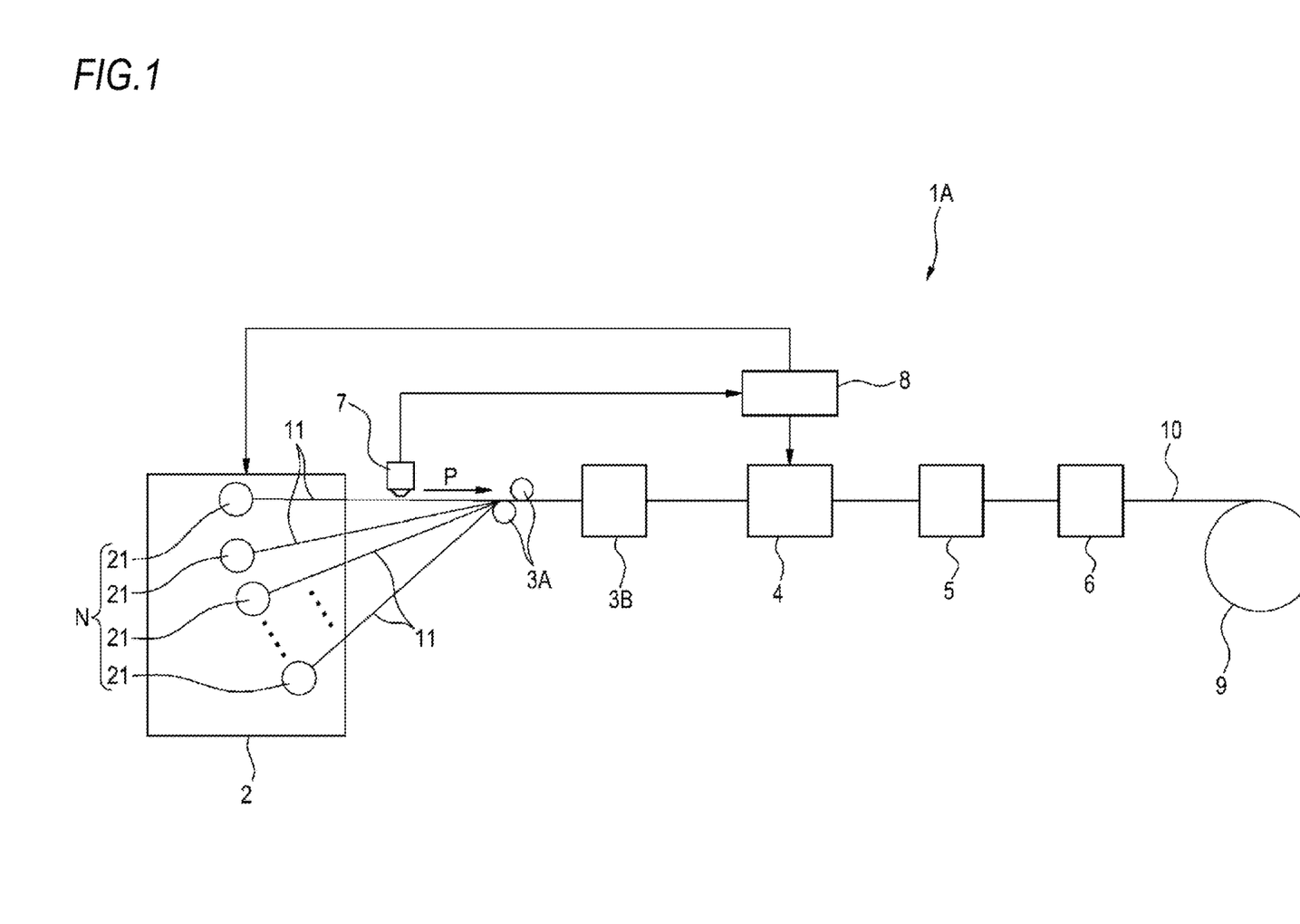
FIG. 1 is a diagram illustrating a manufacturing apparatus of an optical fiber ribbon according to a first embodiment of the present disclosure.

FIG. 1 illustrates a manufacturing apparatus 1A of an optical fiber ribbon according to a first embodiment of the present disclosure (hereinafter abbreviated as a manufacturing apparatus 1A). As illustrated in FIG. 1, the manufacturing apparatus 1A includes a supply bobbin part 2, a guide roller 3A, a positioning die 3B, a release agent applying part 4, a die 5 and a resin curing apparatus 6 which form a connection resin applying part, a speed sensor 7, a control part 8, and a winding bobbin 9.

The supply bobbin part 2 is formed of N pieces of supply bobbins 21, and a single optical fiber 11 is wound around each supply bobbin 21, respectively. N is the number of core wires of the optical fibers 11 forming the optical fiber ribbon, and for example, when manufacturing the optical fiber ribbon having 12 cores, N=12. The optical fiber 11 is supplied from the respective supply bobbins 21 to have the same traveling speed (a linear speed).

The guide roller 3A is a roller for arranging the plurality of optical fibers 11 supplied from the supply bobbin 21 in parallel and guiding the plurality of optical fibers 11 to the positioning die 3B. The positioning die 3B is a die for determining a traveling position on a pass line P of the plurality of optical fibers 11 sent from the guide roller 3A.

The release agent applying part 4 is arranged on the downstream side of the positioning die 3B and is formed of a plurality of applying apparatuses for applying a release agent between the optical fibers 11. The term "release agent" used herein includes a material that wakens adhesive strength of a connection resin, and is a general term for a chemical agent that prevents the optical fibers from being bonded to each other by the connection resin. For example, as the release agent, a chemical agent containing silicone, a fluorine compound, and alcohol is used.

The connection resin applying part is disposed on the downstream side of the release agent applying part 4, and is formed of the die 5 for applying the connection resin for connecting the optical fibers 11 to each other around the optical fibers 11, and the resin curing apparatus 6 for curing the applied connection resin.

The speed sensor 7 is a sensor that detects the traveling speed of the optical fiber 11 supplied from the supply bobbin 21. The speed sensor 7 transmits the detected traveling speed of the optical fiber 11 to the control part 8. The control part 8 controls an application amount of the release agent in the release agent applying part 4, and an interval at which the release agent is applied based upon the traveling speed of the optical fiber 11 transmitted from the speed sensor 7. The control part 8 controls the traveling speed of the optical fiber 11 fed from the supply bobbin part 2. The winding bobbin 9 is a bobbin that is disposed on the downstream side of the resin curing apparatus 6, and winds up a manufactured intermittently-connected-type optical fiber ribbon 10.

Figure 2:
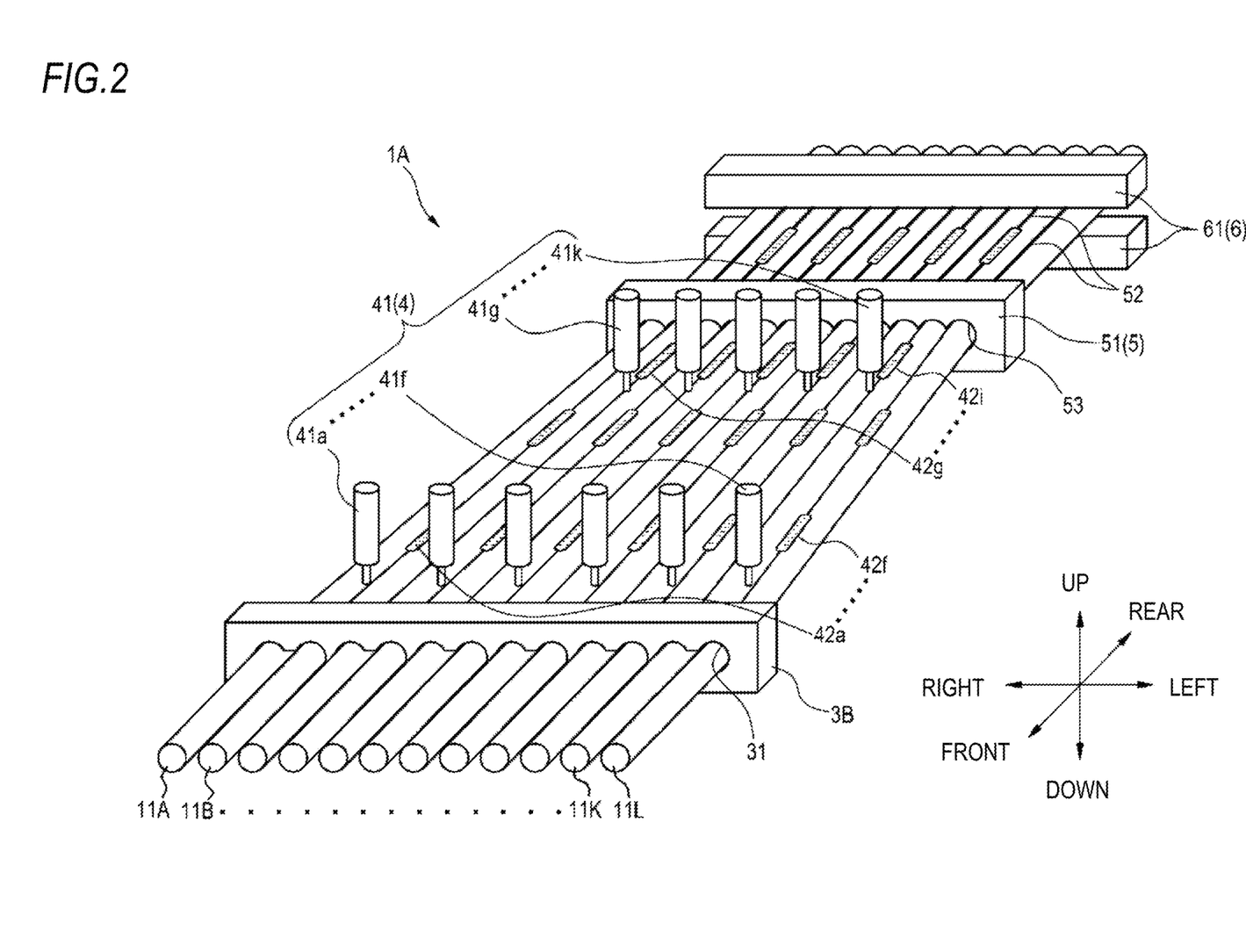
FIG. 2 is a diagram illustrating a partial configuration of the manufacturing apparatus illustrated in FIG. 1.

Next, with reference to FIG. 2, configurations of the positioning die 3B, the release agent applying part 4, and the connection resin applying part in the manufacturing apparatus 1A will be further described. FIG. 2 illustrates a case in which the intermittently-connected-type optical fiber ribbon 10 is manufactured by using the optical fibers 11 (11A to 11L) having 12 cores (N=12).

As illustrated in FIG. 2, a positioning hole 31 for allowing the optical fibers 11A to 11L to pass therethrough is formed in the positioning die 3B. The positioning hole 31 is formed at a predetermined interval so that each slight gap can be formed between the adjacent optical fibers of the optical fibers 11A to 11L passing therethrough. The optical fibers 11A to 11L passing through the positioning die 3B are disposed in parallel on the pass line P in a state where the slight gap is formed between the optical fibers.

The release agent applying part 4 is formed of 11 pieces of release agent applying apparatuses 41 (41a to 41k) that apply the release agent between the 12 pieces of the optical fibers 11 (11A to 11L). Here, the release agent applying apparatuses 41a to 41f for applying the release agent between the optical fibers 11A and 11B, between the optical fibers 11C and 11D, between the optical fibers 11E and 11F, between the optical fibers 11G and 11H, between the optical fibers 11I and 11J, and between the optical fibers 11K and 11L are disposed on the upstream side (the front side in FIG. 2). The release agent applying apparatuses 41g to 41k for applying the release agent between the optical fibers 11B and 11C, between the optical fibers 11D and 11E, between the optical fibers 11F and 11G, between the optical fibers 11H and 11I, and between the optical fibers 11J and 11K are disposed on the downstream side (the rear side in FIG. 2). In the release agent applying apparatuses 41a to 41f, for example, an existing mechanism used for intermittently applying the connection resin may be used.

The release agent applying apparatuses 41a to 41f intermittently apply the release agent 42 (42a to 42f) from the upper side (the upper side in FIG. 2) of a surface of the optical fiber between the respective optical fibers at a predetermined interval. The release agent applying apparatuses 41g to 41k intermittently apply the release agent 42 (42g to 42k) from a surface of the optical fiber between the respective optical fibers at a predetermined interval. The release agents 42a to 42f and the release agents 42g to 42k are applied side by side in a parallel direction of the optical fiber at the same position in a longitudinal direction of the optical fiber. For example, the release agent is applied so that the positions of the release agents 42a to 42f are between the positions of the release agents 42g to 42k in the longitudinal direction of the optical fiber. The release agents 42a to 42k applied from the surfaces flow into the rear surface sides of the optical fibers through the gaps provided between the optical fibers and are also applied to the rear surface sides thereof at a predetermined interval.

The die 5 determines the traveling positions of the optical fibers 11A to 11L, and applies a connection resin 52 around the optical fibers 11A to 11L. The die 5 is formed of a positioning hole 53 for allowing the optical fibers 11A to 11L to pass therethrough. The positioning hole 53 is formed at an interval so that a gap is not formed between the adjacent optical fibers of the optical fibers 11A to 11L passing therethrough. The optical fibers 11A to 11L to which the release agents 42a to 42k are applied between the optical fibers 11 pass through the die 5, thereby being disposed in parallel in a state where no gap is formed between the adjacent optical fibers 11, and the connection resin 52 is applied thereto.

At a portion where the release agent 42 is not applied on the optical fibers 11A to 11L, the optical fibers 11 are bonded to each other by the connection resin 52, and at a portion where the release agent 42 is applied thereon, the optical fibers 11 are not bonded to each other. The portion where the optical fibers 11 are bonded to each other becomes a connection part where the optical fibers 11 are connected to each other. The portion where the optical fibers are not bonded to each other becomes a non-connection part where the optical fibers 11 are not connected to each other. As the connection resin 52, for example, an ultraviolet curing resin and a thermosetting resin are used.

For example, the resin curing apparatus 6 is an ultraviolet irradiation apparatus 61 when the connection resin 52 is the ultraviolet curing resin, and is a heating apparatus when the connection resin 52 is the thermosetting resin.

Next, with reference to FIG. 3, an example of the intermittently-connected-type optical fiber ribbon manufactured by the manufacturing apparatus 1A will be described. Here an intermittently-connected-type optical fiber ribbon 10A including 24 cores will be described as an example.

Figure 3:
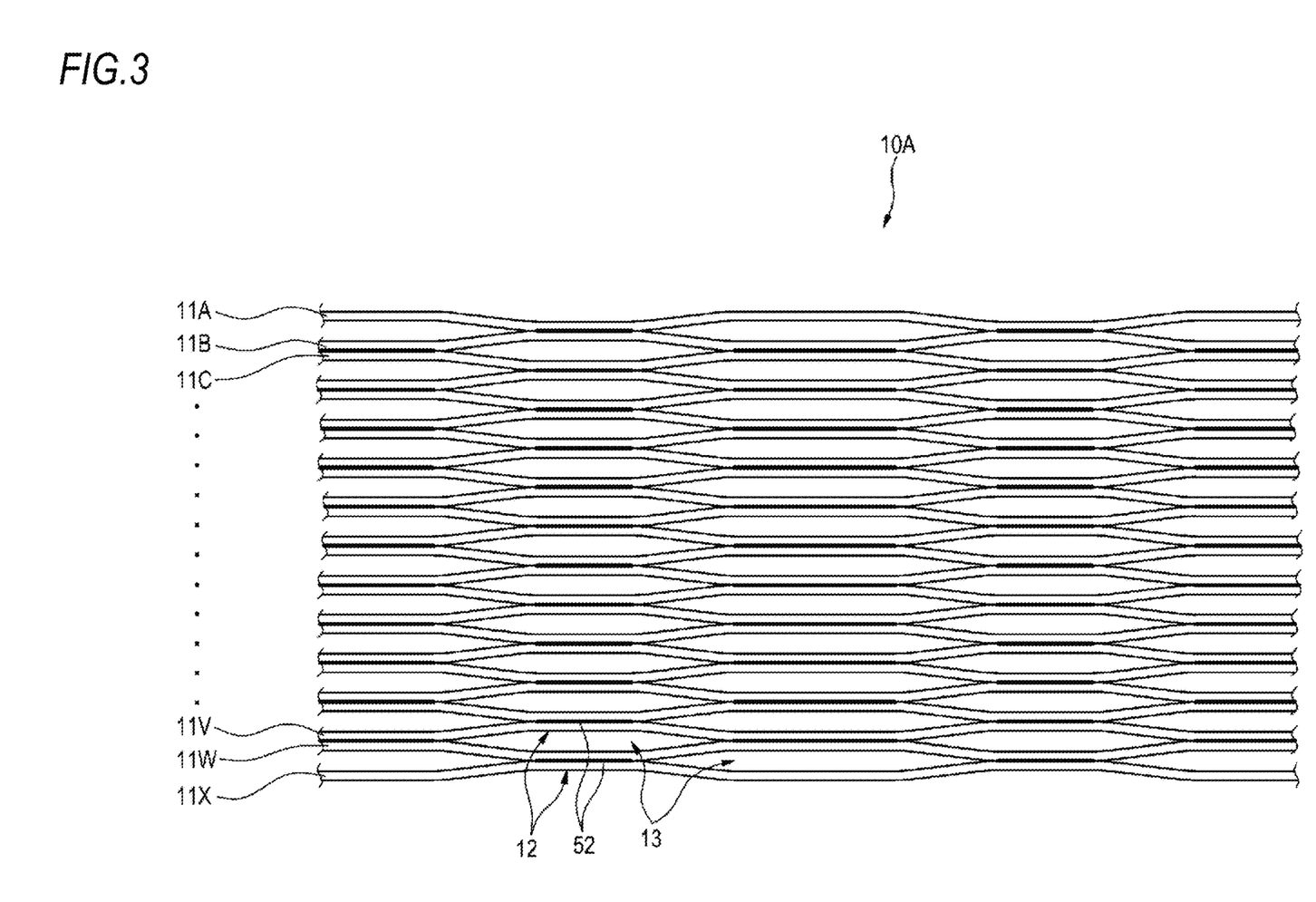
FIG. 3 is a diagram illustrating an example of the optical fiber ribbon manufactured by the manufacturing apparatus of the optical fiber ribbon.

As illustrated in FIG. 3, the intermittently-connected-type optical fiber ribbon 10A is an intermittently-connected-type optical fiber ribbon in which a connection part 12 where the adjacent optical fibers are connected to each other by the connection resin 52 and a non-connection part 13 where the adjacent optical fibers are not connected to each other are intermittently provided in the longitudinal direction in a state where 24 pieces of the optical fibers 11A to 11X are disposed in parallel. A portion to which the release agent 42 is applied by the release agent applying apparatus 41 of the manufacturing apparatus 1A illustrated in FIG. 2 becomes the non-connection part 13 in the intermittently-connected-type optical fiber ribbon 10A illustrated in FIG. 3. A portion to which the release agent 42 is not applied by the release agent applying apparatus 41 of the manufacturing apparatus 1A illustrated in FIG. 2 becomes the connection part 12 in the intermittently-connected-type optical fiber ribbon 10A illustrated in FIG. 3.

FIG. 3 illustrates the intermittently-connected-type optical fiber ribbon in a state where the optical fibers 11A to 11X are opened in an arrangement direction. In an example illustrated in FIG. 3, the optical fibers are intermittently connected for each core. The manufacturing apparatus 1A can also manufacture an intermittently-connected-type optical fiber ribbon which is intermittently connected for every two or more cores by changing the number and arrangement of the release agent applying apparatuses 41.

The optical fibers 11A to 11X illustrated in FIG. 3 are formed with, for example, a glass fiber formed of a core and a clad, and a coating layer for coating the glass fiber. For example, the coating layers of the optical fibers 11A to 11X are colored in respectively different colors so that the optical fibers can be discriminated from each other.

Meanwhile, for example, when intermittently applying the connection resin to the plurality of optical fibers disposed in parallel, in order to obtain good connectivity, it is required to apply the connection resin with a certain thickness. In order to prevent the applied connection resin from flowing, it is required to increase viscosity of the connection resin to some extent.

On the other hand, in the manufacturing apparatus 1A, the release agent 42 is intermittently applied thinly to the surfaces of the plurality of optical fibers disposed in parallel. Since the applied release agent 42 is not required to have a storage property, its viscosity may be lower than that of the connection resin. Therefore, the manufacturing apparatus 1A that intermittently applies the release agent 42 can more improve a linear speed at which the optical fiber travels at the time of manufacturing more than an apparatus that intermittently applies the connection resin. The release agent having viscosity lower than that of the connection resin having high viscosity can form an intermittent pattern with high accuracy on the plurality optical fibers in a state of being disposed in parallel. Therefore, according to the manufacturing apparatus 1A, the intermittently-connected-type optical fiber ribbon can be manufactured efficiently and accurately.

Next, a manufacturing method of the optical fiber ribbon by using the manufacturing apparatus 1A will be described. In the manufacturing apparatus 1A, for example, 12 pieces of the optical fibers 11A to 11L are fed from 12 pieces of the supply bobbins 21 at a predetermined traveling speed and travel on the pass line P.

[Release Agent Applying Process]

The optical fibers 11A to 11L are disposed in parallel and pass through the positioning die 3B. By allowing the optical fibers 11A to 11L to pass through the positioning die 3B, the optical fibers 11A to 11L are disposed on the pass line P in a state where a slight gap is formed between the adjacent optical fibers.

Next, the release agent are supplied from the release agent applying apparatuses 41a to 41f, after which the release agents 42a to 42f are applied at a predetermined interval between the optical fibers 11A and 11B, between the optical fibers 11C and 11D, between the optical fibers 11E and 11F, between the optical fibers 11G and 11H, between the optical fibers 11I and 11J, and between the optical fibers 11K and 11L. In the same manner, the release agents are supplied from the release agents 42g to 42k, after which the release agents 42g to 42k are applied at a predetermined interval between the optical fibers 11B and 11C, between the optical fibers 11D and 11E, between the optical fibers 11F and 11G, between the optical fibers 11H and 11I, and between the optical fibers 11J and 11K.

The control part 8 controls an application interval and an application amount of the release agents 42a to 42k. The release agents 42a to 42f are applied to the same positions in the longitudinal direction of the optical fibers to be arranged in a parallel direction of the optical fibers. In the same manner, the release agents 42g to 42k are applied to the same positions in the longitudinal direction of the optical fibers to be arranged in the parallel direction of the optical fibers. In the longitudinal direction of the optical fiber, the release agents 42a to 42f and the release agents 42g to 42k are respectively intermittently applied so that the positions of the release agents 42a to 42f are disposed between the positions of the release agents 42g to 42k.

The release agents 42a to 42k supplied from the surfaces of the optical fibers flow into the rear surface sides of the optical fibers through the gaps formed between the optical fibers, after which the release agents 42a to 42k are also applied to the rear surface sides of the optical fibers at a predetermined interval.

[Connection Resin Applying Process]

Next, the optical fibers 11A to 11L to which the release agents 42a to 42k are applied between the optical fibers are allowed to pass through the positioning hole 53 of the die 51, thereby being arranged in parallel in a state where the gap is not formed between the adjacent optical fibers. The connection resin 52 is collectively applied by the die 5 around the optical fibers 11A to 11L disposed in parallel in the state where the gap is not formed therebetween.

Next, the resin curing apparatus 6 cures the connection resin 52. For example, when the connection resin 52 is the ultraviolet curing resin, the resin curing apparatus 6 uses the ultraviolet irradiation apparatus to irradiate ultraviolet rays and cure the connection resin 52. Accordingly, the connection resin 52 is bonded to the portion between the optical fibers 11A to 11L where the release agent 42 is not applied, and the connection part 12 where the optical fibers are connected to each other is formed. The connection resin 52 is not bonded to the portion where the release agent 42 is applied, and the non-connection part 13 where the optical fibers are not connected to each other is formed. As such, the intermittently-connected-type optical fiber ribbon 10 including 12 cores in which the connection part 12 and the non-connection part 13 are intermittently provided is manufactured.

According to the manufacturing method of the optical fiber ribbon as described above, by the same reason as that of the manufacturing apparatus 1A, the linear speed can be more improved than the case where the connection resin is intermittently applied, and the intermittent pattern of the release agent can be formed with high accuracy. Accordingly, the intermittently-connected-type optical fiber ribbon can be manufactured efficiently and accurately.

Second Embodiment

Figure 4A:
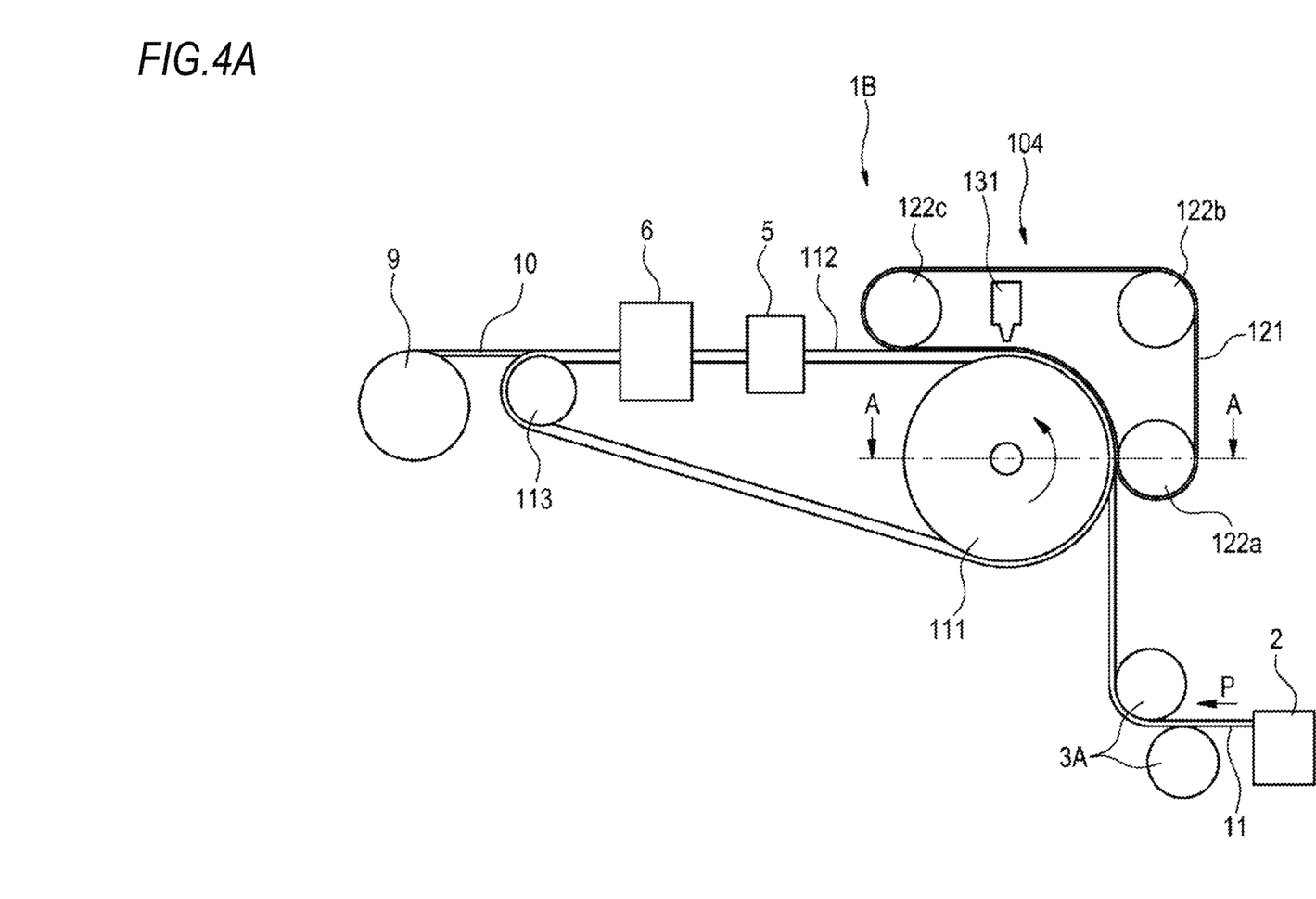
FIG. 4A is a diagram illustrating a manufacturing apparatus of an optical fiber ribbon according to a second embodiment of the present disclosure.
Figure 4B:
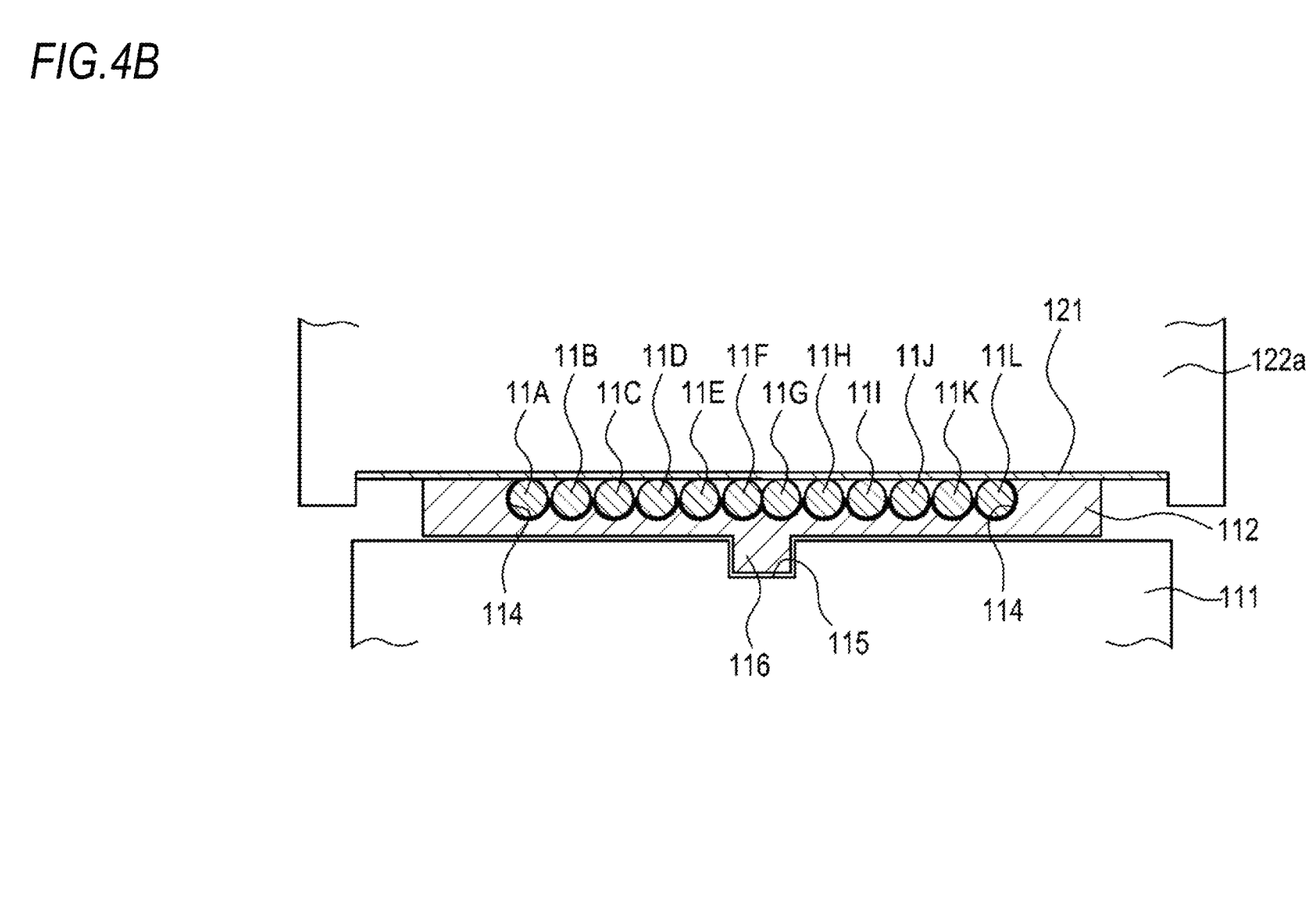
FIG. 4B is a cross-sectional view taken along the line A-A of FIG. 4A.
Figure 5:
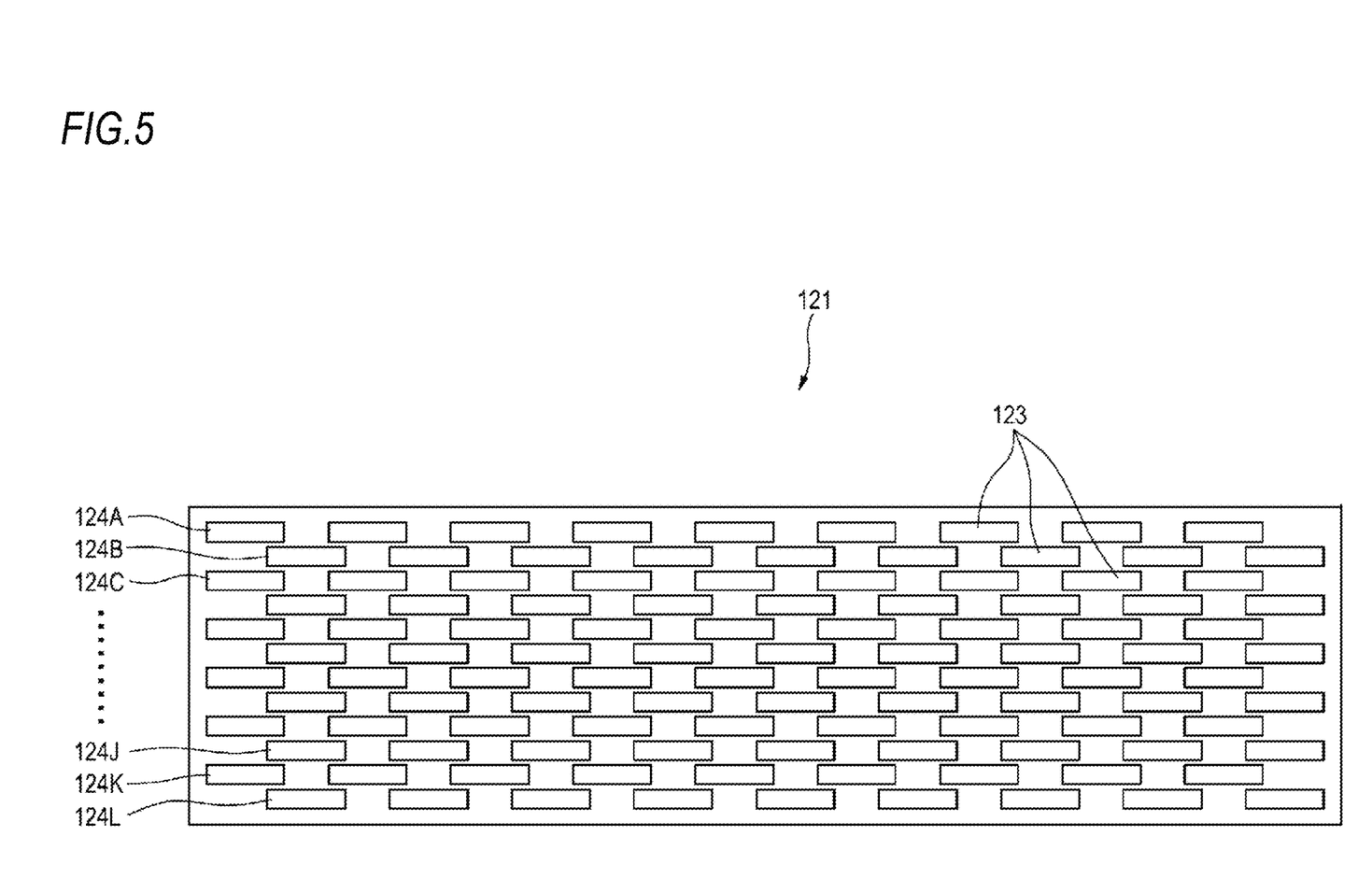
FIG. 5 is a diagram illustrating an example of a screen plate illustrated in FIGS. 4A and 4B.

With reference to FIGS. 4A, 4B, and 5, a manufacturing apparatus 1B of an optical fiber ribbon according to a second embodiment of the present disclosure (hereinafter abbreviated as a manufacturing apparatus 1B) will be described. The same components as those of the manufacturing apparatus 1A according to the first embodiment are denoted by the same reference signs, and the description thereof will be omitted.

FIG. 4A is a diagram illustrating a configuration of the manufacturing apparatus 1B. FIG. 4B is a cross-sectional view taken along the line A-A of FIG. 4A. FIG. 5 is a plan view illustrating an example of a screen plate used when the release agent is applied to the optical fiber. The manufacturing apparatus 1B is different from the manufacturing apparatus 1A of the first embodiment in that a screen plate 121 having a pattern in which a hole 123 is intermittently opened as illustrated in FIG. 5 is used when the release agent is applied to the optical fiber.

As illustrated in FIG. 4A, the manufacturing apparatus 1B includes the supply bobbin part 2, the guide roller 3A, a release agent applying part 104, the die 5 and the resin curing apparatus 6 which form the connection resin applying part, and the winding bobbin 9. The speed sensor 7 and the control part 8 are not illustrated. The release agent applying part 104 includes: a drive roll 111 and a guide roll 113 that allow the plurality of optical fibers 11A to 11L fed from the supply bobbin part 2 to travel on the pass line P; and a traveling guide belt 112 that guides the traveling of the optical fibers 11A to 11L. The traveling guide belt 112 is configured to be repeatedly rolled between the drive roll 111 and the guide roll 113 provided on the downstream side of the resin curing apparatus 6.

The release agent applying part 104 includes: the screen plate 121 rolled corresponding to the traveling of the optical fibers 11A to 11L; and idle rolls 122a to 122c for guiding the roll of the screen plate 121. The screen plate 121 is continuously formed in a belt shape, and is configured to be repeatedly rolled between the three idle rolls 122a to 122c. The screen plate 121 is disposed to overlap the optical fibers 11A to 11L and is rolled in synchronization with a traveling speed of the optical fibers 11A to 11L.

The release agent applying part 104 includes a release agent applying apparatus 131 for applying the release agent 42 on the optical fibers 11A to 11L with which the screen plate 121 is overlapped. The release agent applying apparatus 131 collectively applies the release agent 42 toward the screen plate 121 that overlaps the optical fibers 11A to 11L.

As illustrated in FIG. 4B, the traveling guide belt 112 is formed of a positioning groove 114 that determines each position of the traveling optical fibers 11A to 11L. The optical fibers 11A to 11L are disposed inside the positioning groove 114, thereby being disposed in parallel in a state where each slight gap is formed between the adjacent optical fibers. As illustrated in FIG. 4B, a groove 115 is formed in the drive roll 111. A rib 116 is formed on the rear side of the traveling guide belt 112. By allowing the rib 116 to pass through the groove 115, a position in a direction orthogonal to the traveling direction of the traveling guide belt 112 is not configured to be shifted.

As illustrated in FIG. 5, the screen plate 121 is formed of intermittent pattern rows 124A to 124L, the number of which corresponds to the number of optical fibers of the intermittently-connected-type optical fiber ribbon 10 to be manufactured (12 pieces in this example). In each of the intermittent pattern rows 124A to 124L, a pattern of the holes 123 that are respectively and intermittently opened is formed. For example, the pattern of the holes 123 is formed in a pattern such that the holes 123 of the adjacent intermittent pattern rows are shifted from each other. The screen plate 121 is disposed so that the intermittent pattern rows 124A to 124L are respectively overlapped on the core wires of the optical fibers 11A to 11L. The screen plate 121 is formed of, for example, a stainless rigid material.

According to the manufacturing apparatus 1B, when the release agent 42 is applied, the release agent 42 may be collectively applied toward the screen plate 121, such that for example, it is not required to provide a mechanism for intermittently supplying the release agent. Therefore, the linear speed of the manufacturing apparatus can be further improved. Since a desired intermittent pattern can be formed in advance by the screen plate 121, it is possible to easily manufacture the intermittently-connected-type optical fiber ribbon having different intermittent patterns only by changing the screen plate 121. Accordingly, it is possible to manufacture the intermittently-connected-type optical fiber ribbon efficiently and accurately.

Next, a manufacturing method of the optical fiber ribbon will be described by using the manufacturing apparatus 1B.

[Release Agent Applying Process]

The optical fibers 11A to 11L fed from the supply bobbin part 2 are disposed inside the positioning groove 114 of the traveling guide belt 112 of the release agent applying part 104, and travel. The optical fibers 11A to 11L are located inside the positioning groove 114 formed in the traveling guide belt 112, whereby the optical fibers 11A to 11L are disposed in parallel in a state where each slight gap is formed between the adjacent optical fibers.

The screen plate 121 is disposed to be overlapped on the core wires of the optical fibers 11A to 11L disposed in parallel with the slight gap, and the release agent 42 is collectively applied from the release agent applying apparatus 131 toward the screen plate 121. The release agent 42 collectively applied thereto is applied on the core wires of the optical fibers 11A to 11L in the pattern of the holes 123 opened in the screen plate 121. The release agent 42 flows into the rear surface side of the optical fiber through the gap formed between the optical fibers, whereby the rear surface side of the optical fiber is also applied with the pattern of the holes 123 of the screen plate 121.

Next, a connection resin applying process of applying the connection resin 52 is the same as that of the manufacturing method of the optical fiber ribbon using the manufacturing apparatus 1A of the first embodiment.

According to the manufacturing method of the optical fiber ribbon as described above, the intermittently-connected-type optical fiber ribbon can be manufactured efficiently and accurately.

Figure 6:
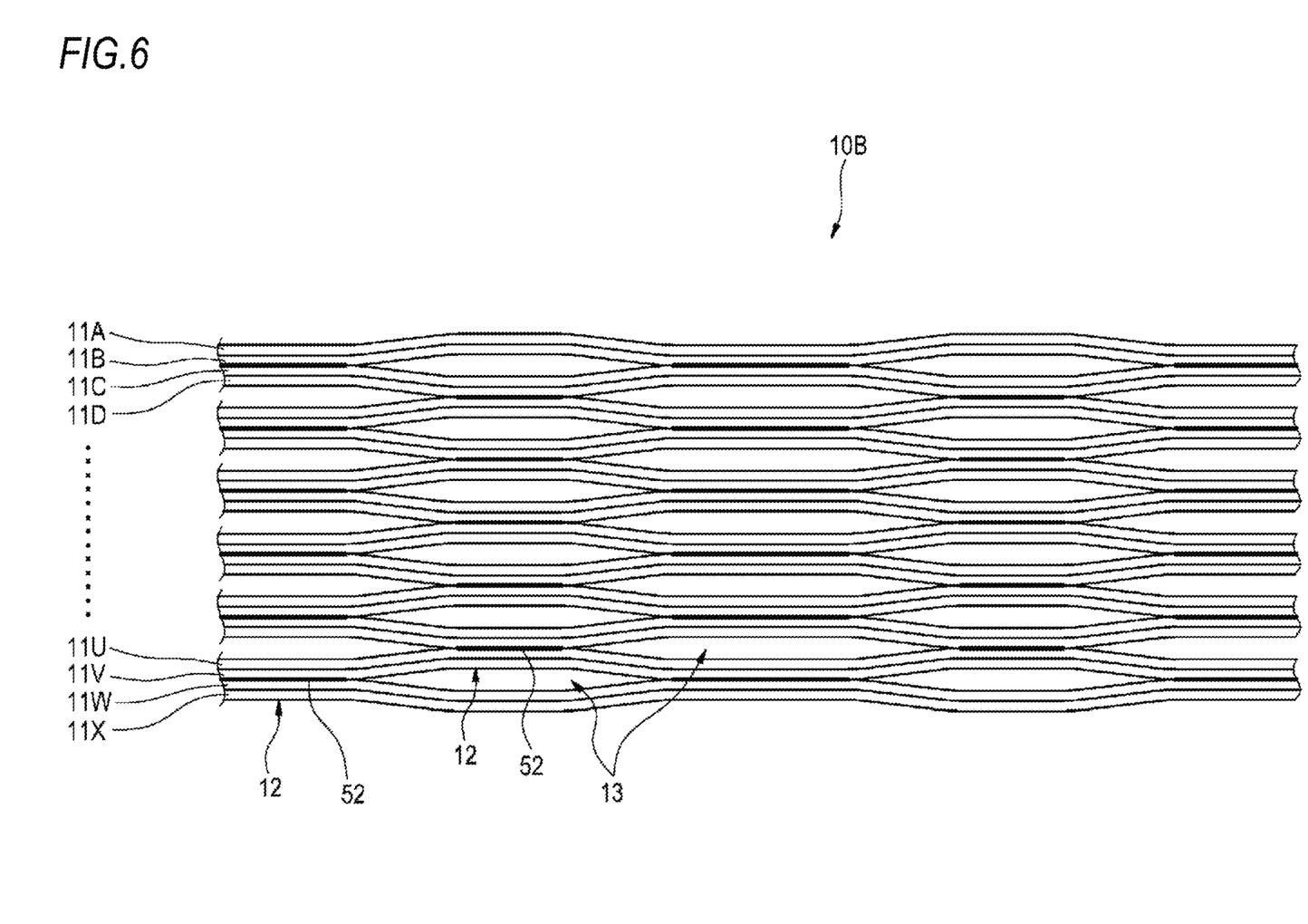
FIG. 6 is a diagram illustrating another example of an optical fiber ribbon manufactured by a manufacturing method of the optical fiber ribbon and a manufacturing apparatus thereof.

The manufacturing apparatus and the manufacturing method of the optical fiber ribbon according to the first embodiment and the second embodiment as described above are not limited to the intermittently-connected-type optical fiber ribbon 10A of a single-core intermittent type illustrated in FIG. 3. For example, an intermittently-connected-type optical fiber ribbon which is intermittently connected for every two or more cores such as the intermittently-connected-type optical fiber ribbon 10B of a two-core intermittent type illustrated in FIG. 6 can be also manufactured.

In the first embodiment, it is possible to manufacture the intermittently-connected-type optical fiber ribbon which is intermittently connected for every two or more cores by changing the number and arrangement of the release agent applying apparatuses 41 of the manufacturing apparatus 1A illustrated in FIG. 2. In the second embodiment, it is possible to manufacture the intermittently-connected-type optical fiber ribbon which is intermittently connected for every two or more cores by changing the screen plate 121 to a different screen plate.

Hereinabove, while the present disclosure is described in detail and with reference to specific embodiments, it is apparent to those skilled in the art that various changes and modifications can be made without departing from the spirit and scope of the present disclosure. The number, position, and shape of the components described above are not limited to the above-described embodiments, and can be changed to the number, position, and shape suitable for implementing the present disclosure.

REFERENCE SIGNS LIST 1A, 1B: manufacturing apparatus of optical fiber ribbon (manufacturing apparatus)
3B: positioning die
4, 104: release agent applying part
5: die (a part of connection resin applying part)
6: resin curing apparatus (a part of connection resin applying part)
10, 10A, 10B: intermittently-connected-type optical fiber ribbon
11 (11A to 11X): optical fiber
12: connection part
13: non-connection part
42 (42a to 42k): release agent
52: connection resin
111: drive roll
112: traveling guide belt
121: screen plate
122a to 122c: idle roll

The invention claimed is:

1. A manufacturing method of an optical fiber ribbon for manufacturing an intermittent-connection-type optical fiber ribbon including a connection part and a non-connection part, the manufacturing method comprising:
a release agent applying process of intermittently applying a release agent for preventing optical fibers from being bonded to each other with a connection resin in a longitudinal direction of the optical fibers in a state where the optical fibers are arranged in parallel; and
a connection resin applying process of allowing the optical fibers in the state of being arranged in parallel to pass through a die for applying the connection resin around the optical fibers after the release agent applying process, and of curing the connection resin.

2. The manufacturing method of the optical fiber ribbon according to claim 1, wherein
the release agent applying process is a process of intermittently supplying and applying the release agent from surfaces of the optical fibers in the state of being arranged in parallel.

3. The manufacturing method of the optical fiber ribbon according to claim 1, wherein
the release agent applying process is a process of applying the release agent through a screen plate having a pattern in which holes are intermittently opened.

4. The manufacturing method of the optical fiber ribbon according to claim 1, wherein
the release agent includes silicone.

5. The manufacturing method of the optical fiber ribbon according to claim 1, wherein
the release agent includes a fluorine compound.

6. The manufacturing method of the optical fiber ribbon according to claim 1, wherein
the release agent includes alcohol.

7. A manufacturing apparatus of an optical fiber ribbon for manufacturing the intermittent-connection-type optical fiber ribbon including a connection part and a non-connection part, the manufacturing apparatus comprising:
a release agent applying part that intermittently applies a release agent for preventing optical fibers from being bonded to each other with a connection resin in a state where the optical fibers are arranged in parallel; and
a connection resin applying part that allows the optical fibers to which the release agent is intermittently applied to pass through a die for applying the connection resin around the optical fibers, and that cures the connection resin.

* * * * *